United States Patent [19]
Ozawa et al.

[11] Patent Number: 6,163,239
[45] Date of Patent: Dec. 19, 2000

[54] DUTY DRIVEN SOLENOID VALVE

[75] Inventors: Hiromasa Ozawa; Takao Kojima; Hidekazu Himei, all of Tokyo, Japan

[73] Assignee: Mitsubishi Denki Kabushiki Kaisha, Tokyo, Japan

[21] Appl. No.: 09/463,515

[22] PCT Filed: Aug. 25, 1997

[86] PCT No.: PCT/JP97/02944

§ 371 Date: Jan. 27, 2000

§ 102(e) Date: Jan. 27, 2000

[87] PCT Pub. No.: WO99/10670

PCT Pub. Date: Mar. 4, 1999

[51] Int. Cl.$^7$ ...................................................... H01F 3/00
[52] U.S. Cl. ...................... 335/256; 251/129.01
[58] Field of Search .................... 335/256, 278, 335/280; 251/129.01, 129.02, 129.08, 129.14, 129.15; 137/625, 625.65; 239/88, 96

[56] References Cited

U.S. PATENT DOCUMENTS

| | | | |
|---|---|---|---|
| 5,000,420 | 3/1991 | Hendrixon et al. | 251/129.08 |
| 5,075,584 | 12/1991 | Hendrixon et al. | 310/14 |
| 5,556,175 | 9/1996 | Hayakawa et al. | 303/119.2 |
| 5,915,416 | 6/1999 | Okazaki et al. | |
| 6,027,037 | 2/2000 | Murakami et al. | 239/88 |

FOREIGN PATENT DOCUMENTS

| | | |
|---|---|---|
| 2-248782 | 10/1990 | Japan . |
| 2-248783 | 10/1990 | Japan . |
| 4-74780 | 6/1992 | Japan . |
| 6-35758 | 5/1994 | Japan . |
| 7-32471 | 6/1995 | Japan . |
| 7-38779 | 9/1995 | Japan . |
| 8-105563 | 4/1996 | Japan . |

*Primary Examiner*—Lincoln Donovan
*Assistant Examiner*—Tuyen Nguyen
*Attorney, Agent, or Firm*—Sughrue, Mion, Zinn, Macpeak & Seas, PLLC

[57] ABSTRACT

The present invention provides a compact duty-driven solenoid valve which inhibits occurrence of impact sound upon driving and prevents occurrence of adherence at low temperatures. In this duty-driven solenoid valve, a plunger is arranged in a center hole of a bobbin having a coil wound thereon, and a guide made of a magnetic material is arranged on one end side of the bobbin, opposite to the plunger. A spring is provided so as to impart a force to move the plunger toward the guide, and further, a valve assembly for switching over a channel for a control fluid is arranged opposite to the plunger with the guide in between. A rod for transmitting a moving force of the plunger to the valve assembly is arranged so as to be inserted through the guide and to reach the valve assembly. The positional relationship between the rod and the valve assembly is configured to maintain a prescribed gap between the plunger and the guide during feeding of current to the coil.

1 Claim, 6 Drawing Sheets

DUTY DRIVEN SOLENOID VALVE

TECHNICAL FIELD

The present invention relates to a solenoid valve, and more particularly, to a duty-driven solenoid valve in which a plunger displaces under the action of driving by a solenoid apparatus in response to an electric signal, thereby variably controlling the flow rate.

BACKGROUND ART

FIG. 6 is a sectional view illustrating a conventional three-way nomally closed type duty-driven solenoid valve as disclosed, for example, in Japanese Unexamined Utility Model Publication No. H7-34,271.

This conventional solenoid valve 100 comprises a main body 101 having a coil 102 wound on the outer periphery thereof and a guide hole 103 provided in the interior thereof, a plunger 105 made of a magnetic material which is slidably inserted into a sleeve 104 engaged with the guide hole 103 of the main body 101, a fixed iron core 106 made of a magnetic material, provided coaxially opposite to this plunger 105, a spring 107 which is provided in contact with the plunger 105 and imparts a force to the plunger 105 in a direction of separating the plunger 105 from the fixed iron core 106, and a rod 108 operably connected integrally to a side opposite to the fixed iron core 106 of the plunger 105.

The main body 101 is provided integrally with a valve body 101A. The valve body 101A comprises a ball 109 serving as the valve, an input side and a discharge side valve seats 110a and 110b with and from which the ball 109 comes into contact and is separated, an input port 111 for inputting a fluid pressure into the input side valve seat 110a, and an output port 112 for putting out the fluid pressure to outside. A throughhole is pierced in the fixed iron core 106 at the axial center position, to form a discharge port 113. A shim 114 made of a nonmagnetic material is provided between the plunger 105 and the fixed iron core 106.

In this solenoid valve 100, in a state in which current is fed to the coil 102, the force imparted by the spring 107 acts to press the plunger 105 in a direction toward the discharge side valve seat 110b. The plunger 105, guided by the sleeve 104, slides in the direction toward the discharge side valve seat 110b. Along with displacement of the plunger 105, the rod 108 moves toward the input side valve seat 110a, to bring the ball 109 into contact with the input side valve seat 110a. The input port 111 is thus closed to achieve communication between the output port 112 and the discharge port 113.

When current is fed to the coil 102, a magnetic attracting force acts to attract the plunger 105 toward the fixed iron core 106 against the force imparted by the spring 107. The plunger 105, guided by the sleeve 104, slides toward the fixed iron core 106. Along with displacement of the plunger 105, the rod 108 moves in a direction leaving the input side valve seat 110a. The fluid pressure acts from the input port 111 to the ball 109 which leaves the input side valve seat 110a and comes into contact with the discharge side valve seat 1110b. The discharge port 113 is thus closed, thus achieving communication between the input port 111 and the output port 112.

By thus controlling the power to the coil 102, opening/closing operation of the channel is accomplished. Pressure of the output port 112 varies as shown in FIG. 9 by changing the ratio of power fed to the coil 102, i.e., driving ratio (duty %). It is thus possible to control the pressure of the output port 112 to a prescribed pressure by controlling the driving ratio.

When the plunger 105 is magnetically attracted toward the fixed iron core 106 through feeding of power to the coil 102, the plunger 105 comes into contact with the fixed iron core 106 via the shim 114. At this point, there is a gap corresponding to the shim 114 thickness between the plunger 105 and the fixed iron core 106. When feeding of current to the coil 102 is discontinued, therefore, the effect of a residual magnetic flux retaining the plunger on the fixed iron core 106 side is reduced, and the plunger 105 is caused to rapidly move in a direction leaving the fixed iron core 106 by the force imparted by the spring 107.

In the absence of the shim 114, power feeding to the coil 102 brings the plunger 105 into contact with the fixed iron core 106. When power to the coil 102 is shut off, the residual magnetic flux serves to retain the plunger 105 on the fixed iron core 106 side. It is therefore necessary to set a large force imparted by the spring 107 so as not to be affected by the residual magnetic flux, and adjustment of this imparted force has so far been difficult.

In this solenoid valve 100, the pressure of the control fluid acting on the ball 109 serves to push up the plunger 105 onto the fixed iron core 106 side. If an imparted force capable of resisting to this pressure is not previously imparted to the spring 107, the force pressing down the ball 109 against the valve seat 110a could not resist to the pressure of the control fluid, so that the ball 109 leaves the valve seat 110a and the control fluid would flow in through the input port 111.

When assuming that the force of the control fluid pushing up the plunger 105 is P and the force imparted by the spring 107 is F:

When power is not fed to the coil (during OFF): F>P

When power is fed to the coil (during ON):
electromagnetic force+P>F

It is therefore necessary to set electromagnetic force (magnetic attracting force) of the solenoid valve to a value>F+P>0.

In other words, the electromagnetic force must be larger than the force F imparted by the spring 107. When the pressure P of the control fluid is increased, the force F imparted by the spring 107 must also be increased. As a result, the size of the solenoid valve would be larger.

In the solenoid valve 100, furthermore, when the plunger 105 is attracted by an electromagnetic force toward the fixed iron core 106 side, the ball 109 moves apart from the valve seat 110a, the control fluid flows in through the input port 111. At this point, the force P acting on the plunger 105 via the ball 109 decreases, leading to a longer F–P value.

When controlling the control fluid of a large pressure, therefore, the ball 109 leaving the valve seat 110a results in an excessively large F-P value so that the plunger 105 cannot be attracted by an electromagnetic force. The plunger 105 is pushed back, and the ball 109 is moved in a direction of bringing the ball 109 into contact with the valve seat 110a. When the gap between the ball 109 and the valve seat 110a becomes smaller, the force P acting on the plunger 105 via the ball 109 increases, leading to a smaller F–P value, so that the plunger 105 is attracted by an electromagnetic force toward the fixed iron core 106. When controlling the control fluid of such a high pressure, an oscillation phenomenon comprising repeated up-down movement is produced in the plunger 105, thus causing a large sound.

When controlling the control fluid of a high pressure, therefore, it is necessary to increase the magnetic attracting force to prevent oscillation phenomenon of the plunger, thus leading to a larger solenoid valve.

The energizing current with which the plunger 105 begins to move by an electromagnetic force depends upon F–P.

When the force F imparted by the spring becomes larger, the plunger 105 becomes harder to move, and the duty range in which the output port pressure becomes null in FIG. 9 becomes larger. When the force imparted by the spring becomes smaller, on the other hand, the plunger 105 becomes easier to move. The duty range in which the output pressure becomes null in FIG. 9 becomes shorter, and in the non-excited state, the plunger 105 moves along with oscillation of the solenoid valve, thus achieving communication between the input port 111 and the output port 112. In the solenoid valve 100, as described above, change in the force F imparted by the spring affects the properties. It has therefore been necessary to adjust the energizing current.

Further in this solenoid valve 100, upon feeding a current to the coil 102, the plunger 105 hits the fixed iron core 106 via the shim 114 under the effect of magnetic attracting force of the coil 102. Upon discontinuing power supply to the coil 102, the plunger 105 is pushed back by the force imparted by the spring 107, and the ball 109 collides with the valve seat 110a. A problem is therefore that two collisions occur in a period in feeding current to the coil 102, resulting in a big noise.

Because the shim 114 is arranged in a free state between the plunger 105 and the fixed iron core 106, the switching operation of the power to the coil 102 produces a play of the shim 114, and the shim 114 held between the plunger 105 and the fixed iron core 106 repeatedly suffers impact. A long-term use therefore causes wear of the shim, leading to breakage thereof.

Inflow of the control fluid into the space between the plunger 105 and the shim 114 and outflow of the control fluid through the space between the plunger 105 and the shim 114 occur repeatedly. When viscosity of the control fluid becomes higher at low temperatures, therefore, inflow and outflow resistance of the control fluid becomes larger, and this poses a problem of a difference in operating time from the operation at high temperatures and resultant change in properties at low temperatures. Further, depending upon the size of the shim 114, there may be posed another problem of adherence of the shim 114 to the plunger 105 in contact.

To avoid adherence described above, an improvement measure of achieving a line contact between the plunger and the shim is proposed, for example, as disclosed in Japanese Utility Model Publication No. H7-38,779, by making some contrivances for the end face shape of the plunger.

FIG. 7 is a perspective view illustrating a plunger in a conventional solenoid valve as disclosed in Japanese Utility Model Publication No. H7-38,779.

The plunger 105 has radial grooves 105a formed on an end face thereof. These radial grooves 105a are formed around a center hole 105b housing a spring 107 in the radial direction toward outside, adjacent to each other in the circumferential direction to cover the entire circumference.

In this solenoid valve, the plunger 105 and the shim 114 are in line contact which has a very small contact area. Even when viscosity of the control fluid increases, therefore, the control fluid is non-existent at the contact portion thereof, and the plunger 105 is not affected by the control fluid.

A long use however causes wear of the end faces of the plunger 105, change from line contact into plane contact between the plunger 105 and the shim 114, so that the plunger 105 is affected by the control fluid.

To avoid occurrence of cracks in the shim, an improvement measure of eliminating play of the shim by securing the shim to the plunger is proposed, as disclosed in Japanese Unexamined Utility Model Publication No. H4-74,780.

Even when the shim is secured to the plunger, however, the shim is subjected to repeated impact from the fixed iron core, and for some flaws or thickness of the shim, breakage of the shim is induced by a long-term use, and no perfect counter-measure has been available.

DISCLOSURE OF THE INVENTION

The present invention was developed to solve the foregoing problems, and has an object to provide a compact duty-driven solenoid valve in which the plunger is attracted in the valve sheet direction, and which prevents occurrence of hit noise and adherence at low temperatures.

The duty-driven solenoid of the invention controlling a pressure of an output port to a prescribed value by feeding current at a certain frequency to a coil and altering the energizing time of the frequency, comprising: a case which forms a part of the magnetic circuit; a hollow cylindrical bobbin having a center hole formed therein and having the coil wound on the outer periphery thereof; a hollow cylindrical bush made of a magnetic material and engaging with the center hole of the bobbin from one end side of the bobbin; a plunger made of a magnetic material, formed into a hollow cylindrical shape with a bottom and inserted into the center hole of the bobbin reciprocally in the axial direction of the center hole of the bobbin with an opening thereof directed toward one end side of the bobbin; a guide made of a magnetic material, having a rod inserting throughhole and arranged on the other end side of the bobbin so as to coaxially align the rod inserting throughhole with the center hole of the bobbin, which magnetically attracts the plunger while the coil is fed with current; a housing having an input port, an output port and a discharge port, and arranged opposite to the plunger holding the guide therein; a rod made of a nonmagnetic material and inserted reciprocally into the rod inserting throughhole of the guide in the axial direction of the rod inserting throughhole, which is pressed by the plunger magnetically attracted by the guide while the coil is fed with current to move toward the housing; a spring arranged in the center hole of the bobbin between an inside end surface of the case at one end of the bobbin and the plunger and imparting a force to the plunger toward the guide to bring the plunger into contact with the rod; and a valve assembly, arranged in the housing, which switches over channels comunicating between the output port and the input port and communicating between the output port and the discharge port under the effect of a difference in pressure between the force imparted by the spring and the magnetic attracting force acting via the rod, on the one hand, and the pressure of a control fluid acting via the input port, on the other hand; wherein the force imparted by the spring is set at a value which is less than the pressure of the control fluid, and wherein the plunger is configured so as not to be in contact with the inside end surface of the case while the coil is not being fed with current and so as to hold a prescribed gap between the plunger and guide while the coil is being fed with current.

BEST MODE FOR CARRYING OUT THE INVENTION

Now, a few preferred embodiments will be described below with reference to the drawings.

Embodiment 1

Figure 1:
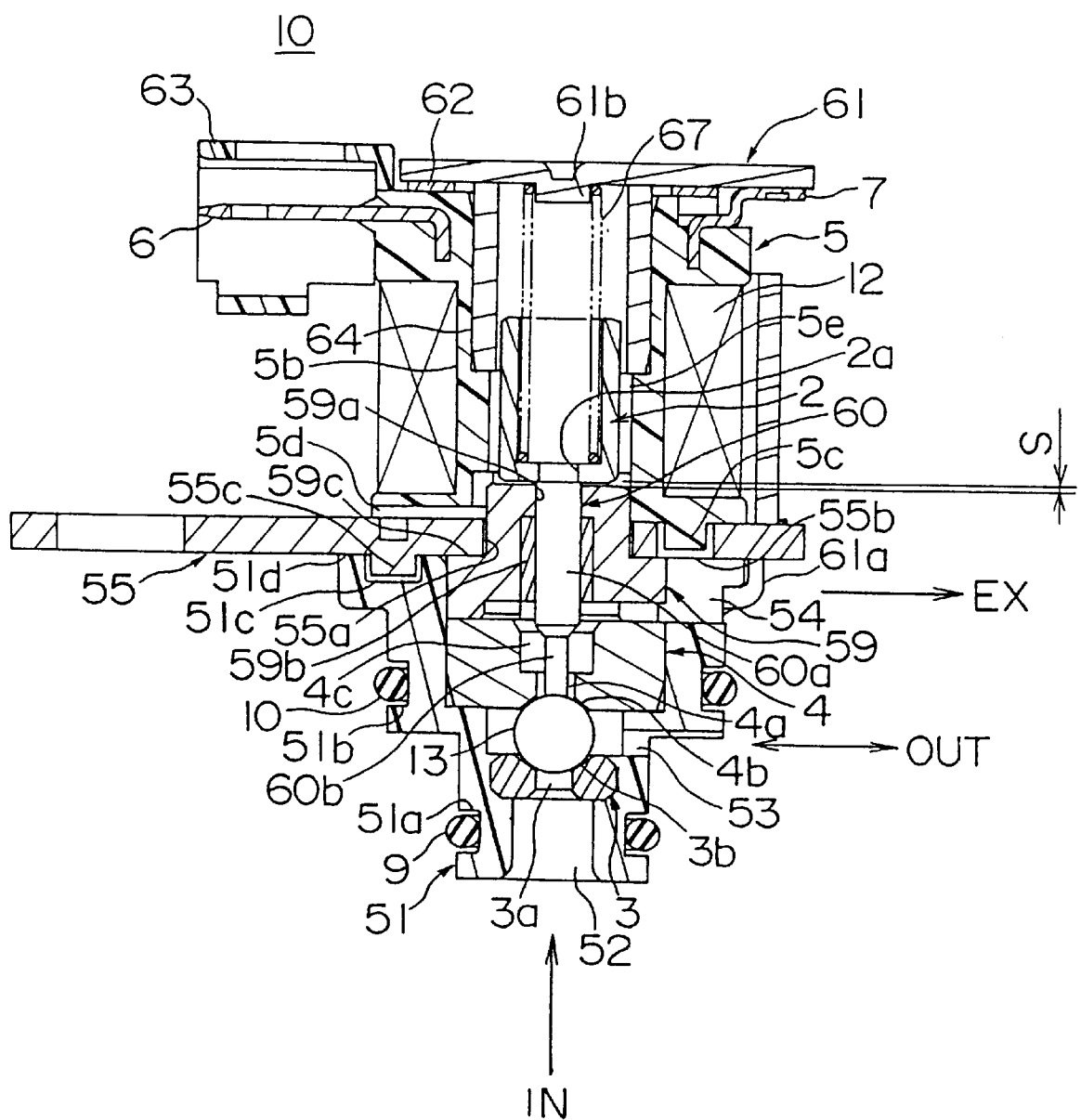
FIG. 1 is a sectional view illustrating the non-energizing state of a three-way nomally open type duty-driven solenoid valve of a first embodiment of the present invention.
Figure 2:
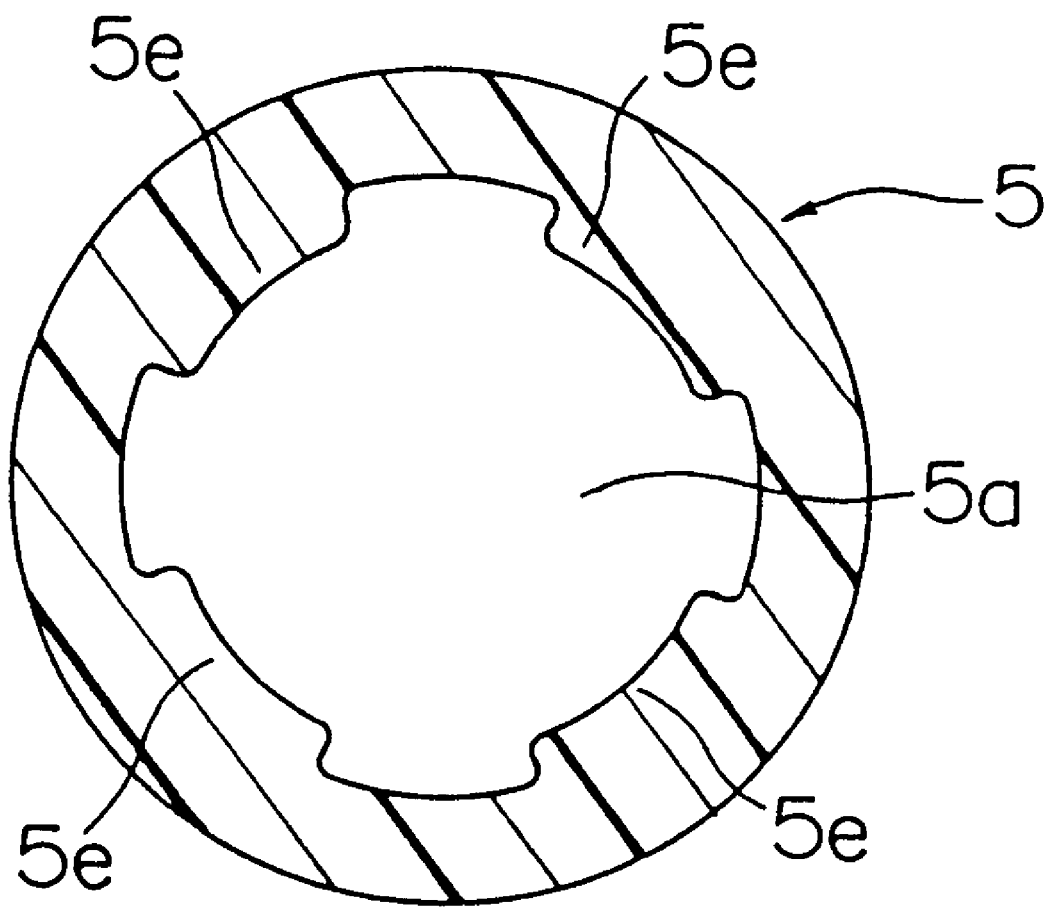
FIG. 2 is a sectional view illustrating a bobbin applied to the three-way nomally open type duty-driven solenoid valve of the first embodiment of the invention.
Figure 3:
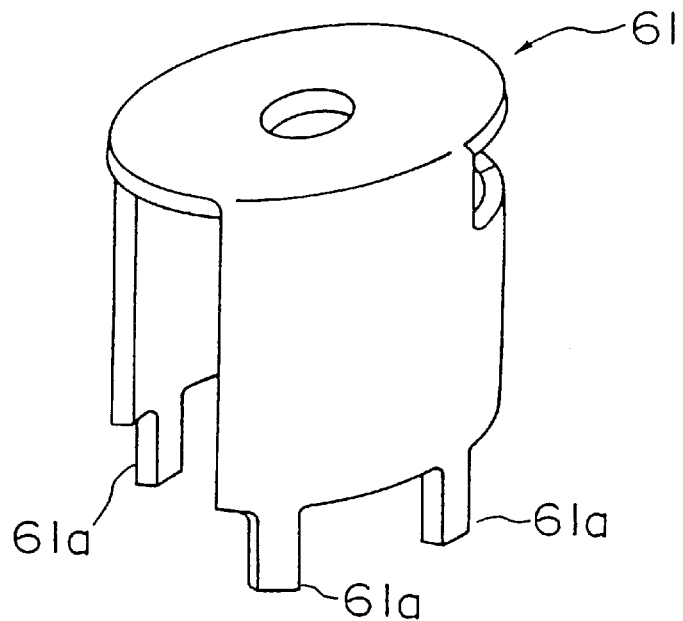
FIG. 3 is a perspective view illustrating a case applied to the three-way nomally open type duty-driven solenoid valve of the first embodiment of the invention.

FIG. 1 is a sectional view illustrating the non-energizing state of a three-way nomally open type duty-driven solenoid valve of a first embodiment of the present invention; FIG. 2 is a sectional view illustrating a bobbin applied to the three-way nomally open type duty-driven solenoid valve of the first embodiment of the invention; and FIG. 3 is a perspective view illustrating a case applied to the three-way nomally open type duty-driven solenoid valve of the first embodiment of the invention.

In FIG. 1, a housing 51 has an input port 52, an output port 53 and a discharge port 54, is provided with O-ring grooves 51a and 51b, into which O-rings 9 and 10 are attached, on the outer periphery thereof, and has an engagement hole 51c serving as an engaged section for positioning a plate 55. The housing 51 is formed with a resin in this embodiment, but may be formed with a metal.

A first valve seat body 3 has a first throughhole 3a pierced therein, and a first valve seat 3b is formed by tapering a side edge of the first throughhole 3a. A second valve seat body 4 has a second throughhole 4a pierced therein, and a second valve seat 4b is formed by tapering a side edge of the second throughhole 4a. The other side of the second throughhole 4a is formed into a large-diameter section 4c having a large diameter. The first and second valve seat bodies 3 and 4 are made, for example, of stainless steel, and are heat-treated by hardening or the like or surface-hardening-treated by nitriding or the like to inhibit wear caused by a long-term use.

A guide 59 is made, for example, of a magnetic material such as iron, and has a rod inserting throughhole 59a pierced therein for inserting a rod 60. A hollow cylindrical sleeve 59b made of a non-magnetic material such as copper is engaged in the rod inserting throughhole 59a.

The first and second valve seat bodies 3 and 4 are arranged in the housing 51 with a prescribed gap in between the first and second valve seats 3b and 4b at opposite positions. Further, the guide 59 is arranged in the housing 51 so that the guide 59 is in contact with the upper portion of the second valve seat body 4. The first and second valve seat bodies 3 and 4 and the guide 59 are arranged so that centers of the first and second throughholes 3a and 4a are aligned with a center of the rod inserting throughhole 59a. A ball 13 is provided between the first and second valve seat bodies 3 and 4. The ball 13 comes into close contact with the first valve seat 3b to clog off the input port 52, thus achieving communication between the output port 53 and the discharge port 54. On the other hand, the ball 13 comes into close contact with the second valve seat 4b to shut off communication between the output port 53 and the discharge port 54, thus achieving communication between the input port 52 and the output port 53. A valve assembly is composed of the first and second valve seat bodies 3 and 4 and the ball 14.

A bobbin 5 is formed with a resin into a hollow cylindrical shape and has a coil winding section 5b provided on the outer periphery thereof. A projection 5c serving as an engaged section for positioning is provided at the lower end thereof, and further, a discharge groove 5d for outflow of the control fluid is provided at the lower end thereof so as to run from the center hole 5a to outside. Terminals 6 and 7 are provided integrally on the upper side of the bobbin 5. Further, a cover 63 made of a resin is attached to the bobbin 5 so as to cover the projection of the terminal 6. A coil 12 is wound on the coil winding section 5b. An end of the coil 12 is electrically connected to the terminal 6, and the other end of the coil 12 is electrically connected to the terminal 7. A hollow cylindrical bush 64 made of a magnetic material such as iron is inserted into the center hole 5a of the bobbin from above. The plunger 2 is made of a magnetic material such as iron, is formed into a hollow cylindrical shape with a bottom, and is inserted into the center hole 5a of the bobbin 5 with the opening directed upward. A discharge hole 2a is pierced in the bottom of the plunger 2. As shown in FIG. 2, four guides 5e are provided in the circumferential direction on the inner wall of the center hole 5a of the bobbin 5 to permit sliding of the plunger 2 guided by the guides 5e. A spring 67 is pressed and provided in the center hole 5a of the bobbin 5 to impart a force to the lower portion of the plunger 2.

A plate 55 is made of a magnetic material such as iron, and there are formed, in the plate 55, a throughhole 55a for insertion of the guides 59, a hole 55b serving as an engagement section for positioning the bobbin, into which the projection 5c of the bobbin 5 is to be inserted, and a projection 55c serving as an engagement section for positioning the hosing, to engage with an engagement hole 51c of the housing 51. A rod 60 is made of a nonmagnetic material such as stainless steel, formed into a solid cylindrical shape, having a large-diameter section 60a to be inserted into the rod inserting throughhole 59a of the guide 59, and a small-diameter section 60b to be inserted into the second throughhole 4a of the second valve seat body 4. The rod 60 is heat-treated by hardening or surface-hardening-treated such as nitriding to inhibit ware caused during a long use.

A case 61 is made of a magnetic material such as iron and formed into a hollow cylindrical shape with a bottom as shown in FIG. 3. A plurality of fixing claws 61a are provided on the opening side thereof, and a projection 6 1b for positioning the spring 67 is provided on the center inner surface of the bottom thereof.

Assembly of the solenoid valve 10 having the foregoing configuration is accomplished by assembling the plate 55 from above into the housing 51 already incorporating first the first and second valve seat bodies 3 and 4, the guides 59 and the ball 13. In this assembly operation, the plate 55 is positioned by inserting the guides 59 into the throughhole 55a and engaging the projection 55c with the engagement hole 51c of the housing 51.

Then, the rod 60 is inserted from above into the rod inserting throughhole 59a of the guide 59. Then, the bobbin 5 having the terminals 6 and 7, the coil 12, the bush 64 and the plunger 2 assembled therein is assembled from above into the housing 51. At this point, the bobbin 5 is positioned via the plate 55 relative to the housing 51 by engaging the projection 5c with the hole 55b of the plate 55.

Then, the spring 67 is inserted from above into the center hole 5a of the bobbin 5. Subsequently, the wave washer 62 is arranged on the upper portion of the bobbin 5, and the case 61 covers from above the entire bobbin 5. The claw 61a is caulked while pressing down the case 61 to integrally arrange the housing 51, the plate 55 and the bobbin 5. Then, the end of the terminal 7 is welded together with the case 61, thus completing assembly of the solenoid valve 10.

In the thus assembled solenoid valve 10, a magnetic circuit is formed with the bush 64, the case 61, the plate 55, the guide 59 and the plunger 2. An end of the spring 67 is engaged with the projection 61b of the case 61 for positioning to impart a force to the plunger 2 toward the guide 59 but not so as to bring the end surface of the plunger 2 in contact with the case 61. When the coil 12 is fed with current, the plunger 2 is magnetically attracted toward the guide 59, guided by the guide unit 5e of the bobbin 5 to move toward the guide 59, and stops at a position where the ball 13 comes into contact with the first valve seat 3b. At this point, the rod 60 is formed into such a length that a prescribed gap S is achieved between the plunger 2 and the guide 59.

When the first and second valve seat bodies 3 and 4, the guide 59 and the ball 13 are incorporated in the housing 51, the contact surface 59c of the guide 59 with the plate 55 is formed so as to slightly project from the upper end face 51d of the housing 51. The wave washer 62 is plastically deformed through caulking of the claw 61a of the case 61, thus ensuring a prescribed pressing load. The pressing load of the wave washer 62 therefore serves to press the guide 59 and the second valve seat body 4 against the housing 51c, thus preventing occurrence of a play of the guide 59 and the second valve seat body 4.

Figure 4:
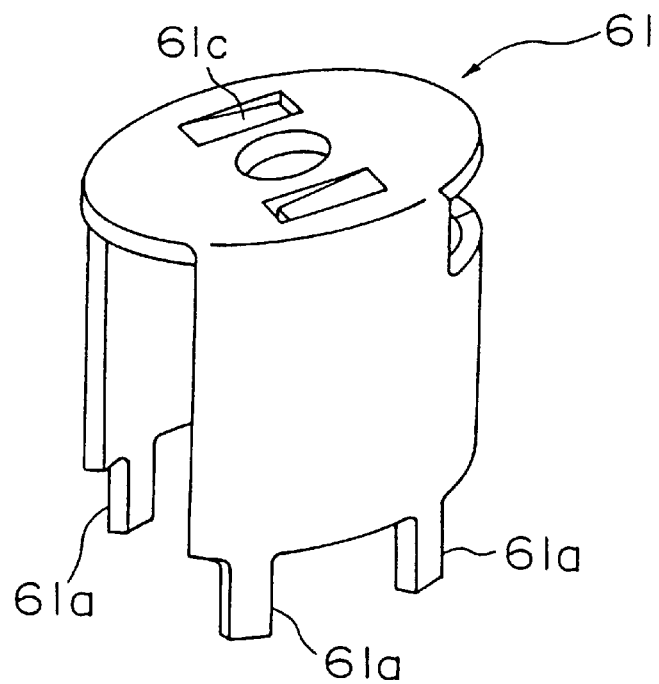
FIG. 4 is a perspective view illustrating another embodiment of the case applied to the three-way nomally open type duty-driven solenoid valve of the first embodiment of the invention.

While in the present embodiment described above, the contact surface 59c of the guide 59 with the plate 55 slightly projects from the upper end face 51d of the housing 51, a convex step may be provided on the contact surface of the plate 55 with the guide 59 so that the convex step presses the guide 59. While the wave washer 62 is provided between the case 61 and the bobbin 5, a pressing load may be ensured by providing a pressing piece 61c on the bottom of the case 61 and using the pressing piece 61c for pressing load as shown in FIG. 4.

Now, operations of this solenoid valve 10 will be described below.

In the non-energizing state, the force imparted by the spring 67 acts to press the plunger 2 toward the guide 59. Pressure of the control fluid acts on the ball 13, and the ball 13 is in contact with the second valve seat 4b against the force imparted by the spring 67 acting via the plunger 2 and the rod 60. Communication is thus established between the input port 52 and the output port 53, and the discharge port 54 is closed.

When current is fed to the coil 12, magnetism is produced in the magnetic circuit composed of the bush 64, the case 61, the plate 55, the guide 59 and the plunger 2, and the plunger 2 is magnetically attracted toward the guide 59. The plunger 2 guided by the guide unit 5e slides toward the guide 59. Along with this movement of the plunger 2, the rod 60 is pressed to move toward the first valve seat 3b, and the ball 13 is brought into contact with the first valve seat 3b. The input port 52 is thus closed, and communication is achieved between the output port 53 and the discharge port 54. At this point, there is present a gap S between the plunger 2 and the guide 59.

Figure 8:
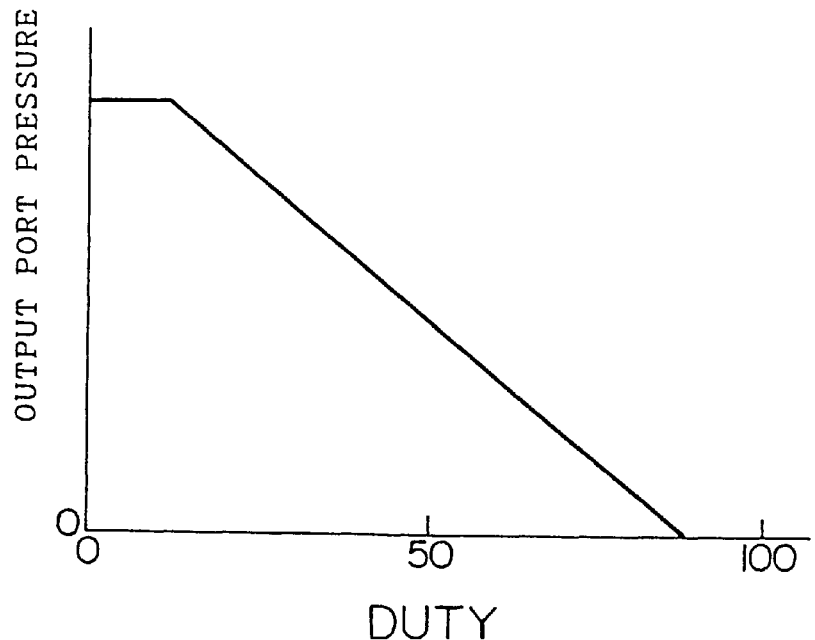
FIG. 8 is a graph illustrating the relationship between duty and pressure of an output port in a nomally open type duty-driven solenoid valve.
Figure 9:
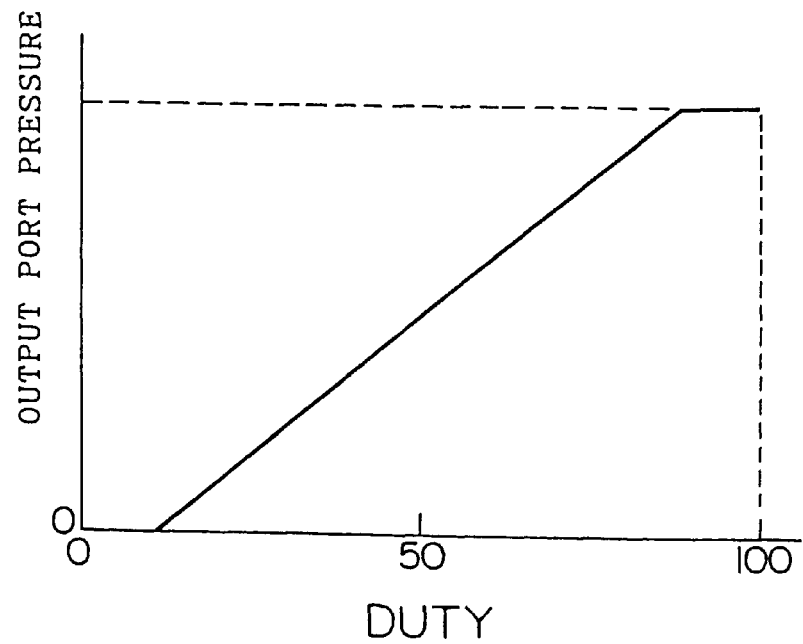
FIG. 9 is a graph illustrating the relationship between duty and output port pressure in a nomally closed type duty-driven solenoid valve.

Opening/closing operation of the channel is accomplished by controlling the current fed to the coil 12 as described above. Pressure of the output port 53 varies as shown in FIG. 8 by changing the ratio of power fed to the coil 12, i.e., by altering the driving ratio (duty %). It is therefore possible to control the output port 53 pressure to a prescribed value by feeding current at a certain frequency, and altering the energizing time at this frequency. That is, the output port 53 pressure can be easily adjusted.

When the plunger 2 is magnetically attracted toward the guide 59 by feeding the coil 12 with current, the plunger 2 and the guide 59 are separated from each other by a gap S. When current fed to the coil 12 is discontinued, therefore, the effect of residual magnetic flux to retain the plunger 2 on the guide 59 side is reduced, and the plunger 2 is quickly moved by the pressure of the control fluid in a direction of leaving the guide 59.

The control fluid flows into the bobbin 5 through the gap between the rod 60 and the rod inserting throughhole of the guide 59 under the effect of driving of the solenoid valve 10. The control fluid flowing into the bobbin 5 is discharged outside through a discharge hole 2a of the plunger 2 and the discharge groove 5d of the bobbin 5, and is never accumulated within the bobbin 5 or the plunger 2.

The sleeve 59b made of a non-magnetic material is inserted into the rod inserting throughhole 59a of the guide 59. Upon energizing, therefore, the guide 59 is magnetized: fine iron powder is attracted onto the outer periphery of the guide 59, and is never pulled into the throughhole 59a. This permits prevention of a trouble in which fine iron powder pulled into the throughhole 59a of the guide 59 penetrates into the space between the rod 60 and the guide 59, thus causing stoppage of the movement of the rod 60.

In the solenoid valve 10, the force P pushing up the plunger 2 by the control fluid, the force F imparted by the spring 67 and electromagnetic force are set as follows:

During non-energizing of coil 12 (during OFF): P>F
During energizing of coil 12 (during ON):
  Electromagnetic force+F>P Electromagnetic force (magnetic attracting force)>P−F>0

It is therefore suffices that electromagnetic force is larger than the force P pushing up the plunger 2 by the control fluid. Therefore, when the plunger 2 is attracted by electromagnetic force toward the guide 59 and the ball 13 comes closer to the first valve seat 3b, the force P acting on the plunger 2 via the ball 13 and the rod 60 becomes larger. However, because electromagnetic force is set at a value larger than the force P of the control fluid of pushing up the plunger 2, the ball 13 comes into contact with the first valve seat 3b, and the input port 52 is closed.

As a result, the plunger oscillating phenomenon so far produced in the conventional solenoid valve 100 is eliminated, leading to production of no noisy sound resulting from the oscillation phenomenon.

Even under a high pressure of the control fluid, it suffices to set an electromagnetic force larger than (P−F), and it is not necessary to increase the force F imparted by the spring 67, thus permitting downsizing as compared with the conventional solenoid valve.

When setting a smaller force F imparted by the spring 67 so as to permit generation of a large electromagnetic force sufficient to resist to the pressure of the control fluid, current to start operation is never affected by the magnitude of the force F imparted by the spring 67, and the necessity of adjusting output property thereof is eliminated.

A larger force F imparted by the spring 67 leads to more difficult movement of the plunger 2, and there is a longer duty range within which the output port pressure becomes null in FIG. 8. The force F imparted by the spring 67 should preferably be up to 40% of the control fluid pressure.

A smaller force F imparted by the spring 67 leads to easier movement of the plunger 2, and in the non-excited state, the plunger 2 suffers a play along with oscillation of the solenoid valve 10. The ball 13 leaves the second valve seat 4, and communication may be achieved between the output port 53 and the discharge port 54. When this solenoid valve 10 is mounted on a vehicle, the force F imparted by the spring 67 should preferably be set at a load at least twice as high as the weight of the plunger 67 weight since the oscillation acceleration at the mounting place of the solenoid valve is about 1.3 G.

According to the first embodiment, as described above, the solenoid valve has such a configuration that, when the ball 13 is brought into contact with the first valve seat 3b by feeding the coil 12 with current, the plunger 2 is magnetically attracted to a position where a gap S is ensured between the plunger 2 and the guide 59. In this configuration, although feeding the coil 12 with current causes the ball 13 to collide with the first valve seat 3b, upon discontinuing supply of power to the coil 12, the plunger 2 moves in a direction of leaving the guide 59 under the effect of pressure of the control fluid without collision. At this point, while the ball 13 hits the second valve seat 4b under the effect of the pressure of the control fluid as in the conventional solenoid valve 100, the impact sound is very slight and poses no problem. The collision so far caused between the plunger 105 and the fixed iron core 106 in the conventional solenoid valve 100 is eliminated, and there is available a solenoid valve with a reduced impact sound.

Because a gap S is ensured between the plunger 2 and the guide 59, adherence at low temperatures does not occur, and the operating time at low and high temperatures becomes constant, thus permitting achievement of stable opening/closing operations.

The necessity is eliminated of a shim 114 provided for reducing the effect of residual magnetic flux in the conventional solenoid valve 100, thus permitting simplification of the equipment configuration.

During non-energizing period, it suffices that the spring 67 presses the plunger 2 so as to prevent separation between the ball 13 in contact with the second valve seat 4b and the rod 60 and between the rod 60 and the plunger 2. It is not therefore necessary to adjust the force imparted by the spring 67 in response to the presence of the control fluid. Because the force F imparted by the spring 67 can be smaller, the current fed to the coil 12 is not affected by the force F imparted by the spring 67, thus eliminating the necessity of adjusting the energizing current.

Even with a high control fluid pressure, it is not necessary to increase the force F imparted by the spring 67, permitting downsizing, preventing oscillation phenomenon, and eliminating the risk of noise resulting from oscillation phenomenon.

In this configuration, the solenoid valve 10 is divided into a bobbin side and a housing side. It is therefore possible to use parts common to difference types of solenoid valve, thus reducing the cost.

The bobbin 5 and the housing 51 are integrally formed by caulking the claw 61a of the case 61. This improves assembly convenience.

The plate 55 is provided between the bobbin 5 and the housing 51 to position the bobbin 5 and the housing 51 relative to the plate 55, thus further improving assembly convenience.

Embodiment 2

Figure 5:
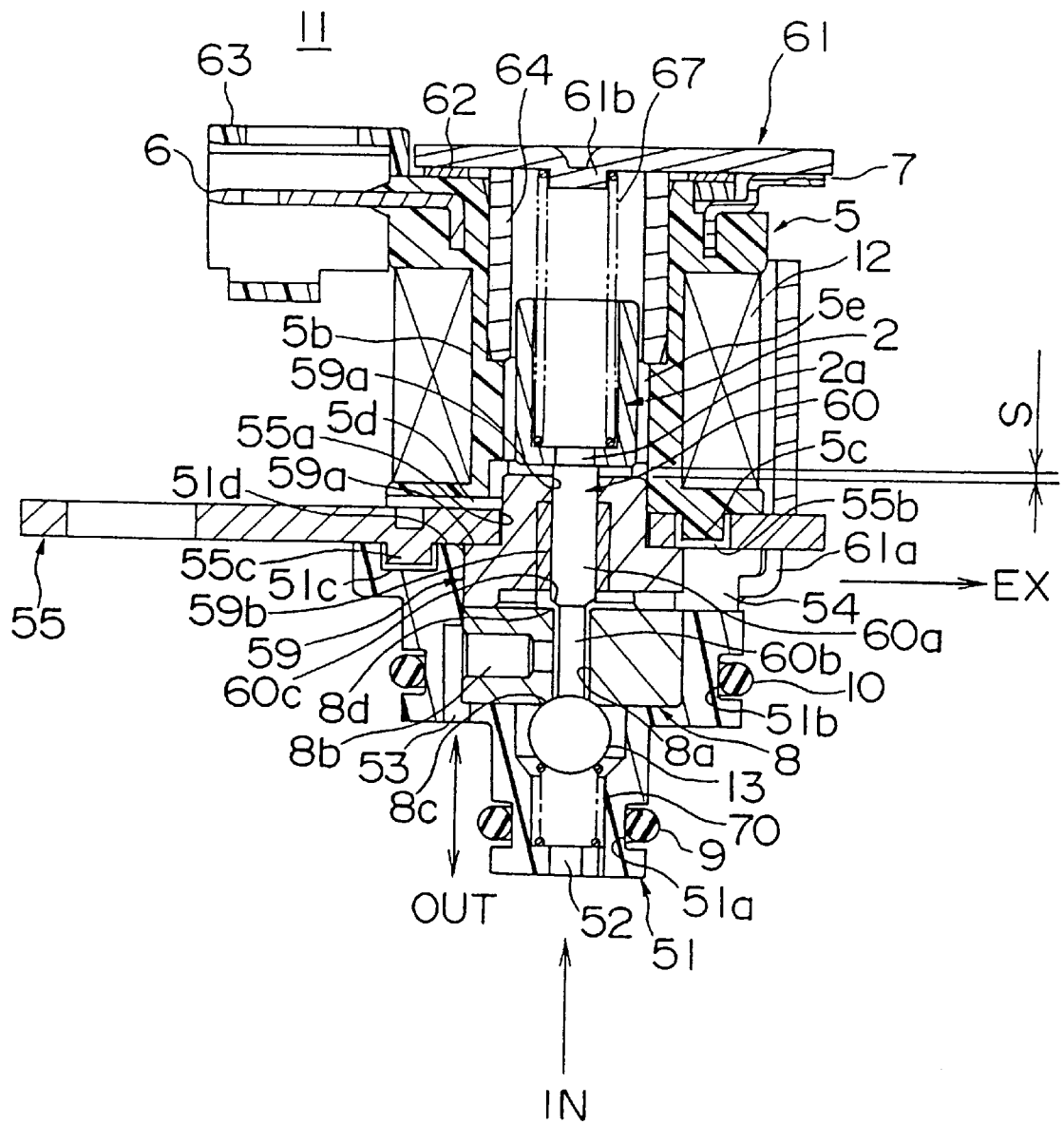
FIG. 5 is a sectional view illustrating the non-energizing state of a three-way nomally closed type duty-driven solenoid valve of a second embodiment of the invention.
Figure 6:
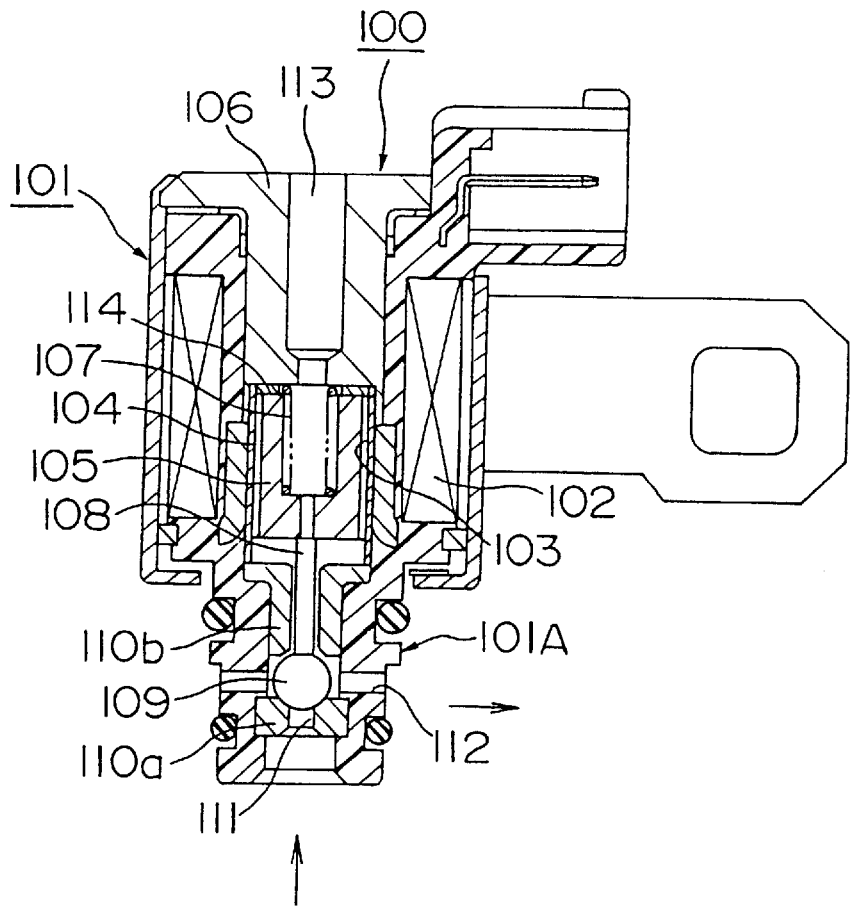
FIG. 6 is a sectional view illustrating a conventional three-way nomally closed type duty-driven solenoid valve.
Figure 7:
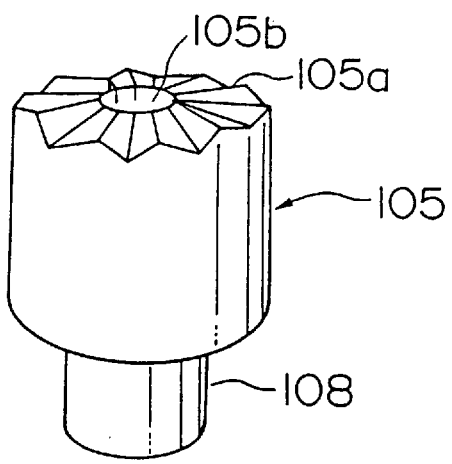
FIG. 7 is a perspective view illustrating a plunger applied to another conventional duty-driven solenoid valve.

FIG. 5 is a sectional view illustrating a three-way nomally closed type duty-driven solenoid valve of a second embodiment of the invention.

In FIG. 5, a valve seat body 8 has a first throughhole 8a pierced in the vertical direction, and a second throughhole 8b pierced from a side to reach the first throughhole 8a. Further, valve seats 8c and 8d are formed by tapering the both end edges of the first throughhole 8a.

The valve seat body 8 is arranged within the housing 51, and a guide 59 is arranged in the housing 51 above the valve seat body 8 so as to be in contact therewith. The valve seat body 8 and the guide 59 are arranged so that the first throughhole 8a is aligned with the center of the rod inserting throughhole 59a. A spring 70 is provided in the housing 51 in a pressed state so as to bring the ball 13 into contact with the valve seat 8c. An output port 53 communicates with a discharge port 54 via the second throughhole 8b and the first throughhole 8a. The rod 60 is formed into a solid cylindrical shape having a large-diameter section 60a to be inserted into the rod inserting throughhole 59a of the guide 59 and a small-diameter section 60b to be inserted into the first throughhole 8a of the valve seat body 8. The rod 60 is formed into such a shape that, when a step portion 60c between the large-diameter section 60a and the small-diameter section 60b comes into contact with the valve seat 8d, the leading end of the small-diameter section 60b causes the ball 13 to leave the valve seat 8c, and the leading end of the large-diameter section 60a comes into contact with the plunger 2 so as to ensure a gap S between the plunger 2 and the guide 59. A valve assembly is composed of the step portion 60c of the rod 60, the valve seat body 8, the ball 13 and the spring 70. For the other parts, the configuration of the second embodiment is the same as that of the foregoing first embodiment.

Now, operations of this solenoid valve 11 will be described below.

In a state in which no current is fed to the coil 12, a force imparted by the spring 67 acts so as to press the plunger 2 toward the guide 59 but not so as to bring the end surface of the plunger 2 in contact with the case 61. Pressure of the control fluid and a force imparted by the spring 70 act on the ball 13 which is in contact with the valve seat 8c against the force imparted by the spring 67 acting via the plunger 2 and the rod 60. The input port 52 is thus closed, the communication is established between the output port 53 and the discharge port 54 via the first and second throughholes 8a and 8b.

When current is fed to the coil 12, magnetism is produced in a magnetic circuit composed of a bush 64, a case 61, a plate 55, a guide 59 and the plunger 2, and the plunger 2 is magnetically attracted toward the guide 59. The plunger 2, guided by the guide unit 5e, slides toward the guide 59. Along with this movement of the plunger 2, the pressed rod 60 moves toward the ball 13, and the ball 13 leaves the valve seat 8c against the control fluid pressure and the force imparted by the spring 70. At the same time, the step portion 60c between the large-diameter section 60a and the small-diameter section 60b of the rod 60 comes into contact with the valve seat 8d. Communication is thus achieved between the input port 52 and the output port 53 via the first and second throughholes 8a and 8b, thus shutting off the output port 53 from the discharge port 54. At this point, a gap S is present between the plunger 2 and the guide 59.

Opening/closing operations of the channel are thus accomplished by controlling feeding of current to the coil 12, as described above. Pressure of the output port 53 varies as shown in FIG. 8 by altering the ratio of current feeding to the coil 12, i.e., altering the driving ratio (duty %). It is therefore possible to control pressure of the output port 53 to a prescribed pressure by feeding current at a certain frequency and changing the energizing time at such a frequency.

In this second embodiment as well, therefore, the same effects as in the foregoing first embodiment are available.

More specifically, according to the second embodiment, the step portion 60c between the large-diameter section 60a and the small-diameter section 60b hits the valve seat 8d upon feeding current to the coil 12, but there occurs no such collision during non-energizing. At this point, as in the solenoid valve 10 of the foregoing first embodiment, the ball 13 collides with the valve seat 8c under the effect of the control fluid pressure, producing a very slight impact sound, hence posing no problem. In the present second embodiment as well, only one collision is caused during a single period of power supply to the coil 12, leading to a reduced impact sound.

Since the gap S is maintained between the plunger 2 and the guide 59, adherence does not occur at low temperatures, and the operating time at high and low temperatures becomes constant, thus giving stable opening/closing operations.

It is not necessary to provide a shim 114 which has so far been necessary for reducing the effect of residual magnetic flux in the conventional solenoid valve 100, thus permitting simplification of configuration.

It suffices that the spring 67 presses the plunger 2, during non-energizing, so as not to allow separation between the ball 13 in contact with the valve seat 8c and the rod 60 and between the rod 60 and the plunger 2. It is thus possible to minimize the force imparted by the spring 67, and because current fed to the coil 12 is not affected by the force F imparted by the spring 67, adjustment of output property thereof can be eliminated.

With a high control fluid pressure as well, it is not necessary to provide a large force F of the spring. This permits downsizing, prevention of oscillation phenomenon and elimination of occurrence of noise resulting from the oscillation.

In a solenoid valve of this type, when viscosity of the control fluid increases at a low temperature, movement of the ball 13 becomes slower and affects the output property. According to the second embodiment, however, the force imparted by the spring 70 for pushing up the ball 13 is always maintained. The slow movement of the ball 13 caused by the increase in viscosity of the control fluid is therefore eliminated, thus giving a stable output property.

As described above the present invention provides a duty-driven solenoid valve controlling pressure of an output port to a prescribed value by feeding current at a certain frequency to a coil and altering the energizing time of the frequency, comprising a case which forms a part of a magnetic circuit; a hollow cylindrical bobbin having a center hole formed therein and having the coil wound on the outer periphery thereof; a hollow cylindrical bush made of a magnetic material and engaging with the center hole of the bobbin from one end side of the bobbin; a plunger made of a magnetic material, formed into a hollow cylindrical shape with a bottom and inserted into the center hole of the bobbin reciprocally in the axial direction of the center hole of the bobbin with an opening thereof directed toward one end side of the bobbin; a guide made of a magnetic material, having a rod inserting throughhole and arranged on the other end side of the bobbin so as to coaxially align the rod inserting throughhole with the center hole of the bobbin, which magnetically attracts the plunger while the coil is fed with current; a housing having an input port, an output port and a discharge port, and arranged opposite to the plunger holding the guide therein; a rod made of a nonmagnetic material and inserted reciprocally into the rod inserting throughhole of the guide in the axial direction of the rod inserting throughhole, which is pressed by the plunger magnetically attracted by the guide while the coil is fed with current to move toward the housing; a spring arranged in the center hole of the bobbin between the inside end surface of the case at one end of the bobbin and the plunger and imparting a force to the plunger toward the guide to bring the plunger into contact with the rod; and a valve assembly, arranged in the housing, which switches over channels communicating between the output port and the input port and communicating between the output port and the discharge port under the effect of a difference in pressure between the force imparted by the spring and the magnetic attracting force acting via the rod, on the one hand, and the pressure of a control fluid acting via the input port, on the other hand; wherein the force imparted by the spring is set at a value which is less than the pressure of the control fluid, and wherein the plunger is configured so as not to be in contact with the inside end surface of the case while the coil is not being fed with current and so as to hold a prescribed gap between the plunger and the guide while the coil is being fed with current. There is therefore available a compact duty-driven solenoid valve which permits prevention of impact sound caused by energizing and non-energizing operations to the coil, prevention of oscillation phenomenon of the plunger and adherence at low temperatures, easy adjustment of the output property, and removal of the shim.

The force imparted by the spring is set at a value, which is a load at least twice as large as the weight of the plunger and up to 40% of the pressure of the control fluid acting via the input port. Stable operations of the plunger is therefore available with a small electromagnetic force, and during non-energizing to the coil, a stable output property is available without a play of the plunger caused by vibration.

A hollow cylindrical sleeve made of a non-magnetic material is engaged with the rod inserting throughhole of the guide. Foreign matters such as iron powder therefore become harder to penetrate into the rod inserting throughhole, thus permitting prevention of an accident of stoppage of movement of the plunger caused by foreign matters.

The bobbin has an end face at the other end provided with a discharge groove running from the center hole to outside, and the plunger has a discharge hole pierced on the bottom thereof so as to permit discharge of the control fluid incoming through the rod inserting throughhole to outside through the discharge groove and the discharge hole. The control fluid does not therefore stagnate in the bobbin or the plunger, thus giving a stable output property.

There is provided a metal case having a bottom plate and a plurality of claws extending from an end of the bottom plate in a direction at right angles to the main surface of the bottom plate, the case being attached to the bobbin so that the main surface of the bottom plate is brought into contact with an end face on one end side of the bobbin and the plurality of claws reach the housing via the outer periphery of the bobbin, and the bobbin being integrally formed with the housing by caulking the plurality of claws. It is therefore possible to improve assembly convenience of the solenoid valve.

An engaged section is formed on the end face on the housing side of the bobbin, and an engaged section is formed on the end face on the bobbin side of the housing; and a plate having a bobbin positioning engaging section and a housing positioning engaging section formed thereon is arranged between the bobbin and the housing through engagement of the engaging sections with the engaged sections of the bobbin and the housing. This permits easy positioning upon assembly, thus further improving assembly convenience.

The case and the plate are made of a magnetic material. It is therefore possible to easily form a magnetic circuit which magnetically attracts the plunger toward the guide.

The valve assembly comprises a first valve seat body having a first throughhole and a first valve seat provided on an edge on one side of the first throughhole, the first valve seat body being arranged so that the other side of the first throughhole faces on the input port and one side of the first throughhole faces on the output port; a second valve seat body having a second throughhole and a second valve seat provided on an edge on one side of the second throughhole, the second valve seat body being arranged with a prescribed gap from the first valve seat body so that the center of the second throughhole agrees with the center of the first throughhole, the second valve seat is opposite to the first valve seat, and the other side of the second throughhole faces on the discharge port; and a ball arranged seatably with the first valve seat and the second valve seat between the first valve seat body and the second valve seat body; wherein the guide is arranged on the second valve seat side of the second valve seat body so that the center of the rod inserting throughhole agrees with the center of the second throughhole; and wherein the rod is formed in such length that, when the rod is inserted into the rod inserting throughhole and the second throughhole and an end thereof comes into contact with the ball seated on the first valve seat, the other end thereof projects by a prescribed height toward the plunger from the rod inserting throughhole. A prescribed gap can therefore be maintained between the plunger and the guide during feeding of current to the coil with a simple configuration.

The first and second valve seat bodies are surface-hardening-treated. There is therefore an improved durability of the first and second valve seats, thus ensuring stable valve operations for a long period of time.

The valve assembly comprises a valve seat body having a first throughhole, a second throughhole pierced from the outer periphery of the valve seat body to reach the first throughhole, and a first and a second valve seats provided at the both end edges of the first throughhole, the valve seat body being arranged so that the first valve seat faces on the input port, the second valve seat faces on the discharge port, the first throughhole communicates with the output port via the second throughhole and the center of the first throughhole agrees with the center of the rod inserting throughhole; and a ball arranged seatably with the first valve seat; wherein the rod is inserted into the rod inserting throughhole and the first throughhole, and has at the center thereof a valve section forming part of the valve assembly by seating on the second valve seat, the rod being formed in such length that, when the valve section is seated on the second valve seat, an end thereof causes the ball to leave the first valve seat, and the other end projects by a prescribed height from the rod inserting throughhole toward the plunger. It is therefore possible to maintain a prescribed gap between the plunger and the guide during energizing to the coil with a simple configuration.

The valve assembly is provided with a spring which imparts a force to the ball in a direction in which the ball is seated on the first valve seat. The slow movement of the ball caused by an increased viscosity of the control fluid can be eliminated, and a stable output property is available.

The valve seat body is surface-hardening-treated. There is therefore available an improved durability of the first and second valve seats, and hence stable valve operations for a long period of time.

What is claimed is:

1. A duty-driven solenoid valve controlling a pressure of an output port to a prescribed value by feeding current at a certain frequency to a coil and altering the energizing time of said frequency, comprising:

a case which forms a part of a magnetic circuit;

a hollow cylindrical bobbin having a center hole formed therein and having said coil wound on the outer periphery thereof;

a hollow cylindrical bush made of a magnetic material and engaging with said center hole of said bobbin from one end side of said bobbin;

a plunger made of a magnetic material, formed into a hollow cylindrical shape with a bottom and inserted into said center hole of said bobbin reciprocally in the axial direction of said center hole of said bobbin with an opening thereof directed toward said one end side of said bobbin;

a guide made of a magnetic material, having a rod inserting throughhole and arranged on the other end side of said bobbin so as to coaxially align said rod inserting throughhole with said center hole of said bobbin, which magnetically attracts said plunger while said coil is fed with current;

a housing having an input port, an output port and a discharge port, and arranged opposite to said plunger holding said guide therein;

a rod made of a non-magnetic material and inserted reciprocally into said rod inserting throughhole of said guide in the axial direction of said rod inserting throughhole, which is pressed by said plunger magnetically attracted by said guide while said coil is fed with current to move toward said housing;

a spring arranged in said center hole of said bobbin between an inside end surface of said case at one end of said bobbin and said plunger, imparting a force to said plunger toward said guide to bring said plunger into contact with said rod; and a valve assembly, arranged in said housing, which switches over channels communicating between said output port and said input port and communicating between said output port and said discharge port under the effect of a difference in pressure between the force imparted by said spring and the magnetic attracting force acting via said rod, on the one hand, and the pressure of a control fluid acting via said input port, on the other hand;

wherein the force imparted by said spring is set at a value which is less than the pressure of said control fluid, and wherein said plunger is configured so as not to be in contact with the inside end surface of said case while said coil is not being fed with current and so as to hold a prescribed gap between said plunger and said guide while said coil is being fed with current.

* * * * *